United States Patent
Chevallier et al.

(10) Patent No.: US 7,590,938 B2
(45) Date of Patent: Sep. 15, 2009

(54) METHOD FOR NAVIGATION WITHIN A SET OF AUDIO DOCUMENTS BY MEANS OF A GRAPHIC INTERFACE AND RECEIVER FOR NAVIGATION BY SAID METHOD

(75) Inventors: Louis Chevallier, La Meziere (FR); Izabela Grasland, Breteil (FR); Jean-Ronan Vigouroux, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 538 days.

(21) Appl. No.: 10/562,779
(22) PCT Filed: Jul. 2, 2004
(86) PCT No.: PCT/FR2004/050305
§ 371 (c)(1), (2), (4) Date: Dec. 29, 2005
(87) PCT Pub. No.: WO2005/006163
PCT Pub. Date: Jan. 20, 2005

(65) Prior Publication Data
US 2006/0202994 A1 Sep. 14, 2006

(30) Foreign Application Priority Data
Jul. 3, 2003 (FR) .................................. 03 08110

(51) Int. Cl.
*G06F 15/00* (2006.01)
*G06F 13/00* (2006.01)
(52) U.S. Cl. ........................................ 715/700; 715/798
(58) Field of Classification Search ......... 715/700–710, 715/798–801, 725–728
See application file for complete search history.

(56) References Cited
U.S. PATENT DOCUMENTS
2003/0030634 A1  2/2003  Sang'udi et al.
2004/0139064 A1  7/2004  Chevallier et al.
2004/0175036 A1* 9/2004  Graham ...................... 382/173
2004/0181747 A1* 9/2004  Hull et al. ................ 715/500.1

FOREIGN PATENT DOCUMENTS
EP          1193623         4/2002

(Continued)

OTHER PUBLICATIONS

A. Konig et al: "An acoustic data base navigator for the interactive analysis of psycho-acoustic sound archives" Proceedings of the 5th International Conference on Soft Computing and Information/Intelligent Systems, Fukuoka, JP, vol. 1, Oct. 16, 1998, pp. 60-63.

(Continued)

*Primary Examiner*—Kevin Nguyen
(74) *Attorney, Agent, or Firm*—Robert D. Shedd; Joseph J. Opalach; Reitseng Lin (57) ABSTRACT

The present invention relates to a method of navigation within a collection of sound documents accessible from a receiver furnished with a display device. The method comprises a first step of analysis of the documents so as to determine audio parameters termed <<low level>> specific to each document. Then, graphics identifiers of part at least of the sound documents are positioned within a graphics page, the arrangement of the graphics identifiers being dependent on the previously calculated parameters. Finally, the method comprises a step of automatic navigation by reproducing successively the sound documents according to a determined strategy taking into account the position of the identifiers of the documents in the graphics page.

The invention also relates to a device able to execute a software navigation module for the reproduction of the sound documents according to a determined strategy and according to the position of the representations of the documents in a graphics page.

18 Claims, 5 Drawing Sheets

FOREIGN PATENT DOCUMENTS

| | | |
|---|---|---|
| WO | WO 01/65346 | 9/2001 |
| WO | WO 02/075591 | 9/2002 |

OTHER PUBLICATIONS

E. Weippl: "Visualizing content based relations in texts", Second Autralasian Gold Coast User Interface Conference, AUIC 2001, Jan. 29, 2001, pp. 34-41.

J. Makhoul et al: "Speech and Language Technologies for Audio Indexing and Retrieval" Proceedings of the IEEE, vol. 88, No. 8, Aug. 2000, pp. 1338-1353.

E. Pampalk et al: "Content-Based Organization and Visualization of Music Archives" Proceedings ACM Multimedia 2002. 10th Int'l Conference on Multimedia, Juan-Les-Pins, FR, vol. CONF. 10, Dec. 1, 2002-Dec. 6, 2002, pp. 570-579.

* cited by examiner

Fig. 1

| Values of low-level parameters of the sound documents | | | | | | |
|---|---|---|---|---|---|---|
| Title of the document | Tempo | Energy | Zero crossing rate | Brightness | Envelope | Bandwidth |
| Joy to the World | 51143 1.86147 | 1.18507 E+8 | 34925 | 3.57 −759.773 | 3464.9 4637.7 | 5666 57743.9 |
| Maggie May – Rod stewart | 22546 2.2132 | 2.45232 E+8 | 15421 | 4.23 −852,2 | 5226 4512.2 | 6233 51283.9 |
| It's too late – Caroline | 44592 1.5623 | 1.1206 E+8 | 34509 | 5.02 −785.773 | 4699.2 5022.8 | 5526 32593.9 |
| Indian Reservation | 34512 1.9445 | 1.84215 E+8 | 39444 | 4.57 −612.1 | 5690 4220.8 | 51254 55263.8 |
| Go Away little girl – Frank Sinatra | 50122 1.9045 | 1.2451 E+8 | 24567 | 4.56 −899.01 | 5692.1 5523.2 | 5256 57998.7 |
| The Partisan Leonard Cohen | 49223 2.1405 | 1.407 E+8 | 28102 | 6.23 −611.744 | 3884.9 4567.7 | 5687 51543.5 |
| Daddy Cool – Boney M | 48599 1.8956 | 1.1054 E+8 | 31022 | 6.01 −562.02 | 3169.2 4199.7 | 5126 57225.0 |
| Just my Imagination | 21559 1.9985 | 1.72945 E+8 | 37405 | 4.58 −566.23 | 3464.9 3652.7 | 5654 57743.6 |
| You've got a friend | 44560 1.8944 | 1.4098 E+8 | 39552 | 3.95 −523.012 | 5264 4415.7 | 5989 55513.8 |
| Brown Sugar – Rolling stones | 53555 2.2600 | 1.244 E+8 | 38626 | 4.98 −528.888 | 3844.5 3926.7 | 5777 52153.2 |

METHOD FOR NAVIGATION WITHIN A SET OF AUDIO DOCUMENTS BY MEANS OF A GRAPHIC INTERFACE AND RECEIVER FOR NAVIGATION BY SAID METHOD

The invention relates to a method of navigation among sound documents accessible with the aid of an audiovisual receiver, and a reproduction apparatus furnished with a graphics user interface making it possible to navigate.

The storage of a large number of sound documents within mass-market equipment is known. Mention may be made of audio compact disc (CD) reading apparatus capable of containing a certain number of CDs, a remote control allowing the user to choose on the one hand the appropriate CD, and on the other hand the appropriate piece in this CD. These apparatuses also possess a programming function making it possible to define a chaining of the sound pieces. During this programming, the user introduces for each piece, the identifier of the CD and the identifier of the piece in the CD. In order to have a certain melodic continuity, the user must know the pieces in advance and program them so as to produce a certain sound continuity during reproduction.

Other means of storing sound contents exist. For example, portable readers (or personal players) have a large-Capacity electronic memory making it possible to record hundreds of musical pieces. Among the latter may be mentioned the MP3 LYRA reader produced and manufactured by the applicant. Some home equipment also has a hard disk of large capacity, 20 gigabytes for example, thereby making it possible to store thousands of sound contents.

The user having access to a large collection of audio contents (for example songs) encounters difficulties in retrieving a determined piece from his collection, with a view to listening to it. It is therefore important to arrange them according to certain criteria and especially to present them so that the user can rapidly retrieve the appropriate piece or pieces. It is known to associate digital data for identifying audio contents, the commonest is the title, but there is also: the producer, the singer, the publisher etc. Other elements called "attributes" make it possible to class a content for example the genre (jazz, vocal, rock, easy music, background music, etc.). On the other hand, certain audio contents accessible to a user do not automatically possess these attributes, for example when the user himself records his musical pieces live. Another way of classifying audio contents is to analyse the sound signals directly. Signal analysis techniques exist which make it possible to calculate values of so-called "low-level" parameters for each audio content. These parameters are for example: the tempo, the energy, the brightness, the envelope, etc. They are determined by analysing the signal either in its digital form, or in its analogue form. A technique of audio content indexation is explained in the article "Speech and Language Technologies for audio indexing and retrieval" published in August 2000 in the IEEE Journal page 1338 to 1353 of Volume 88. The article explains how by analysing the audio signal it is possible to classify the various contents. Other articles describe means of calculating low-level parameters and possible uses, here are some other articles included by reference to the present patent application:

B. Feiten and S. Gunzel, Automatic indexing of a Sound Database using self-organizing neural networks, Computer Music Journal, 18 (3°, 1994

Eric Scheirer, Music Listening systems, PhD thesis, MIT Media Laboratory, April 2000.

The IEEE—WEIPPL document "Visualizing content based relations in texts" published on 29 Jan. 2001, presents various procedures for viewing collections of textual documents by projection into 2D or 3D spaces, employing conventional algorithms such as principal component analysis or Kohonen maps. The user of such a viewing procedure is a person wishing to search for documents and not a person who prefers to listen to contents without intervening.

Once the low-level parameters have been determined for each sound document of the collection, the storage or reproduction apparatus can class them groupwise as a function of these parameters. Thus, the classical music contents may constitute one group, likewise the jazz pieces another group. Patent application PCT/GB01/00681 published on 23 Aug. 2001 describes a user interface consisting of a graphic displayed on a screen and controlled by an audiovisual receiver. The menu displayed exhibits icons ("classical", "jazz", "chart music", "talk back", etc.) selectable by the user, the selection of a document of the group activating the reproduction of its sound content.

Such interfaces facilitate the selection of an audio content but do not allow the automatic chaining of several contents. Such chaining may be carried out by programming on condition that the user knows the various contents in advance. And even in this case, if the user wants to obtain melodious chainings, it is not obvious to him how to do it if he does not have an ear for music.

International Patent Application WO01/65346—MIHALCHEON describes the presentation of an on-line product catalogue. The products appear in the form of icons on the screen and the user can select an icon thereby triggering the audio reproduction related to the object chosen. Passage from one icon to another is effected through navigation according to a strategy built by the catalogue provider. This navigation cannot therefore take into account objects specific to the users terminal, or criteria specific to the user.

The present invention allows a user to successively reproduce audio contents contained in his terminal while maintaining a certain musical unity or at least a certain logic. Moreover, the graphics interface thus defined makes it possible to navigate easily within a large collection of audio content and to reproduce contents that the user desires, doing so in a competitive and user-friendly fashion.

The subject of the invention is a method of navigation within a collection of sound documents stored in a reproduction apparatus furnished with a display device, comprising
a step of storage of each sound document of the collection,
a step of analysis of the documents stored so as to determine audio parameters specific to each document, the method is characterized in that it comprises the following steps:
positioning of graphics identifiers corresponding to at least part of the sound documents on a graphics page of the display device, the position of each graphics identifier being dependent on the parameters calculated previously for a given document,
automatic navigation by selecting and by reproducing successively the sound documents according to a strategy taking into account the position of the graphics identifiers of the documents in the graphics page and a geometric characteristic specific to the reproduction apparatus.

In this way, the method proposes a novel concept of navigation within a set of audio contents, the concept being based on the viewing of a graphical representation of the set and a strategy based on a graphics relation uniting certain graphics identifiers. Thus, the user can see on the graphics page the evolution of the chainings of the sound documents available within his terminal. Moreover, the position of the representations of the documents in the graphics page depends on low-level parameters calculated for each document, hence navigation based on the position of the representations affords a certain degree of auditory continuity.

According to a first improvement, the method comprises a step of determination of groups of documents possessing close parameter values. The graphics identifiers associated with the documents of a group are displayed with a similitude allowing the user to locate the group within the graphics page. Thus, the user can choose a sound document within a clearly determined group of music.

According to another improvement, the method comprises a step of reception of a command for instigating navigation by specifying the navigation strategy used by the receiver for automatically chaining the reproduction of the documents. Several possible navigation strategies exist, all being representable graphically: traversal of a segment, traversal of a spiral or an open shape, definition of a graphics zone containing identifiers and random selection within this zone.

According to another improvement, the method comprises a step of displaying the number of documents reproduced according to the determined strategy. According to another improvement, the method comprises a step of displaying the serial number of the document undergoing reproduction.

The subject of the invention is also a reproduction apparatus comprising a central unit, a means of reception of sound documents, a means of storage of the documents received, a means of introduction of a user command, a means of analysis of the documents stored so as to determine parameters specific to each document, characterized in that it comprises: a means of display of a graphics page of the graphics identifiers corresponding to part at least of the sound documents stored, the position of the graphics identifiers of each document being dependent on the previously calculated parameters, and a means of navigation for the automatic chaining of the reproduction of the documents according to a determined strategy taking into account the position of the graphics identifiers of the documents within the graphics page and a geometric characteristic specific to the reproduction apparatus.

Other characteristics and advantages of the invention will now become apparent with greater details within the framework of the description which follows of exemplary embodiments given by way of illustration and referring to the appended figures which represent.

Figure 1:
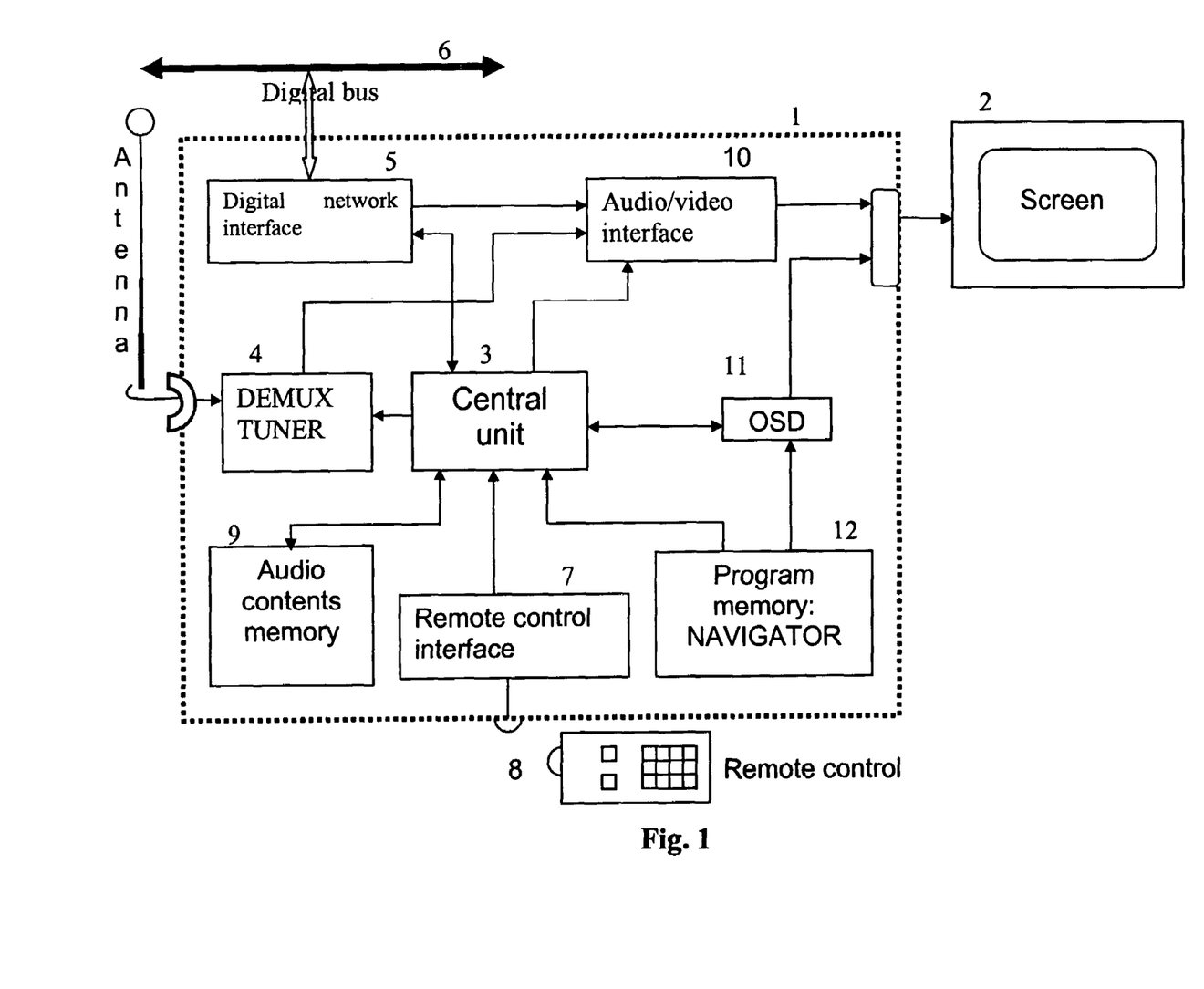
FIG. 1 is a block diagram of a reproduction apparatus for the implementation of the invention.

The manner of operation of a reproduction apparatus 1 such as a multimedia receiver 1 associated with a display device 2 will firstly be described. The receiver comprises a central unit 3 linked to a program memory 12, and an interface 5 for communication with a high bit rate local digital bus 6 making it possible to receive audio and/or video data at high bit rate. This network is for example an IEEE 1394 network. The receiver can also receive audio and/or video data from a transmission network through a reception antenna associated with a demodulator 4, this network can be of radio or television type. The receiver furthermore comprises a receiver of infrared signals 7 for receiving the signals from a remote control 8, a memory 9 for storing a database, and audio/video decoding logic 10 for generating the audiovisual signals dispatched to the television screen 2. The remote control 8 is fitted with direction keys ↑, ↓, → and ← and "OK" and "Select" keys whose function we shall see later.

The receiver also comprises a circuit 11 for displaying data on the screen, often called an OSD circuit, standing for "On Screen Display". The OSD circuit 11 is a text and graphic generator which makes it possible to display menus, pictograms or other graphics on the screen, and menus presenting the navigation. The OSD circuit is controlled by the Central Unit 3 and a navigator 12. The navigator 12 is advantageously embodied in the form of a program module recorded in a read only memory. It may also be embodied in the form of a specialized circuit of ASIC type for example.

The digital bus 6 and/or the transmission network transmit audio contents to the receiver either in digital form, or in analogue form, the receiver recording them in a memory 9. According to a preferred embodiment, the audio contents are received in digital form, preferably coded according to a compression standard, MP3 for example, and stored in the same form. According to this preferred embodiment, the memory 9 is a large-capacity hard disk, 40 gigabytes for example. The storage of a minute of audio content in MP3 occupying around 1 megabyte, such a disk is capable of recording 666 sound hours of document. The downloading of audio content is a well known technique which need not be explained in the present patent application.

Once a certain number of audio contents have been stored in the memory 9. The user wants to reproduce them and to do so without too many manual interventions, he also wants the contents to follow one another with a similitude so as to maintain a harmonious ambiance. To do this, a software module of the navigator analyses each audio content during its reception and extracts the low-level parameters therefrom. As we indicated in the preamble, numerous signal analysis techniques exist which make it possible to obtain arrays of digital descriptors for these songs. The number of elements of a descriptor is of the order of a few tens.

Figure 2:
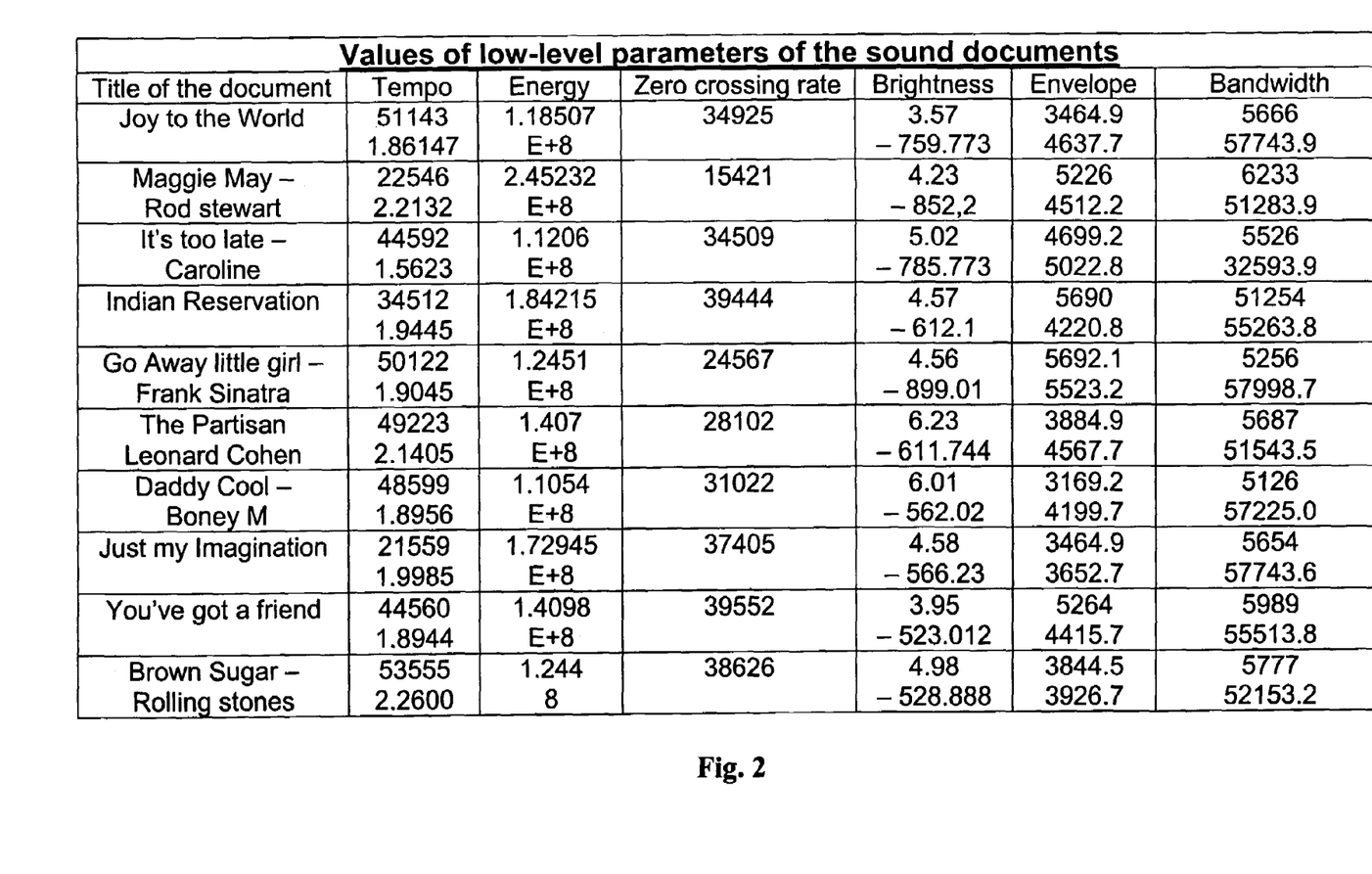
FIG. 2 is an array associating for each document of the collection its values of low-value parameters, FIG. 3 describes a screen shot presenting the collection of documents in a two-dimensional space, FIG. 4 describes a screen shot showing a so-called segment navigation strategy for automatically chaining the sound documents, FIG. 5 describes a screen shot showing a spiral navigation strategy for automatically chaining the sound documents.

The array contained in the screen page of FIG. 2 presents the values of low-level parameters constituting the descriptors of a certain number of audio documents. The first column of the array presents the title of the audio content, each content is numbered. The subsequent columns present the values of low-level parameters associated with the document, such as the mean sound intensity, the tempo, the energy, the zero crossing rate, the brightness, the envelope, the bandwidth, the loudness, the cepstral coefficients, etc.

According to an improvement, the low-level parameters may be provided in digital form together with the audio content. When the content is provided by a means of digital transmission and in compressed form, the associated low-level parameters constituting a field attached to the audio content. This solution is particularly advantageous since the calculation of the parameters is performed by the producer or the provider of the content and not by the user, and hence it is carried out once only.

Be they downloaded or calculated locally, the descriptors are stored in the memory 9 and then utilized to create groups of documents possessing certain similitudes.

According to a first approach, the grouping of the contents into coherent groups (or clusters) may be carried out with the aid of a so-called "clustering" algorithm, for example the k-means algorithm (Mac Queen, "Some Methods for classification and analysis of multivariate observations", Proc Fifth Berkeley Symposium on Math., Stat. and Prob., vol1, pp 281-296, 1967.) The array of descriptors of FIG. 2 possesses a new column defining the group in which the content is situated. Group calculation techniques are well known, using the k-means algorithm the number of groups thus produced can easily be controlled.

According to a second approach, the groups are determined by a prior choice of classes (for example: mood, dominant instruments, tempo, etc.) and a ground truth helping to define these classes. They are obtained by applying a learning algorithm to this ground truth.

According to the present exemplary embodiment of the invention, the sound documents accessible from the receiver are represented on a screen by graphics identifiers. The position of these graphics identifiers that is to say, the spatial coordinates within the graphics page, are obtained from the low-level parameters. According to the example of FIG. 3, the screen represents a two-dimensional navigation space, a point Pi constituting a graphics identifier representing a sound document Si. The coordinates (xi, yi) of a graphics identifier are obtained by projecting the point Pi whose coordinates are the values of the low-level descriptors onto a sound sample, onto a space of dimension 2, 3, etc. depending on the type of representation chosen. The projection is determined by principal component analysis or PCA. PCA is in particular described in the Saporta 1990 document, entitled "Probabilités Analyse de données et statistiques [Probabilities data analysis and statistics], published by Technip. This well-known data analysis algorithm seeks to discover a subsystem of axes that is linearly bound to the original and which best "spreads" the samples, these axes tend to cause the original correlated axes to merge. The low-level descriptors being assumed to have perceptual coherence (the sounds are perceptually close if and only if the values of the low-level descriptors are close), and the projection being continuous, the graphics identifiers that are close on the screen correspond to perceptually close sounds. This example in no way excludes the representation of the collection by a space with more than two dimensions.

Figure 3:
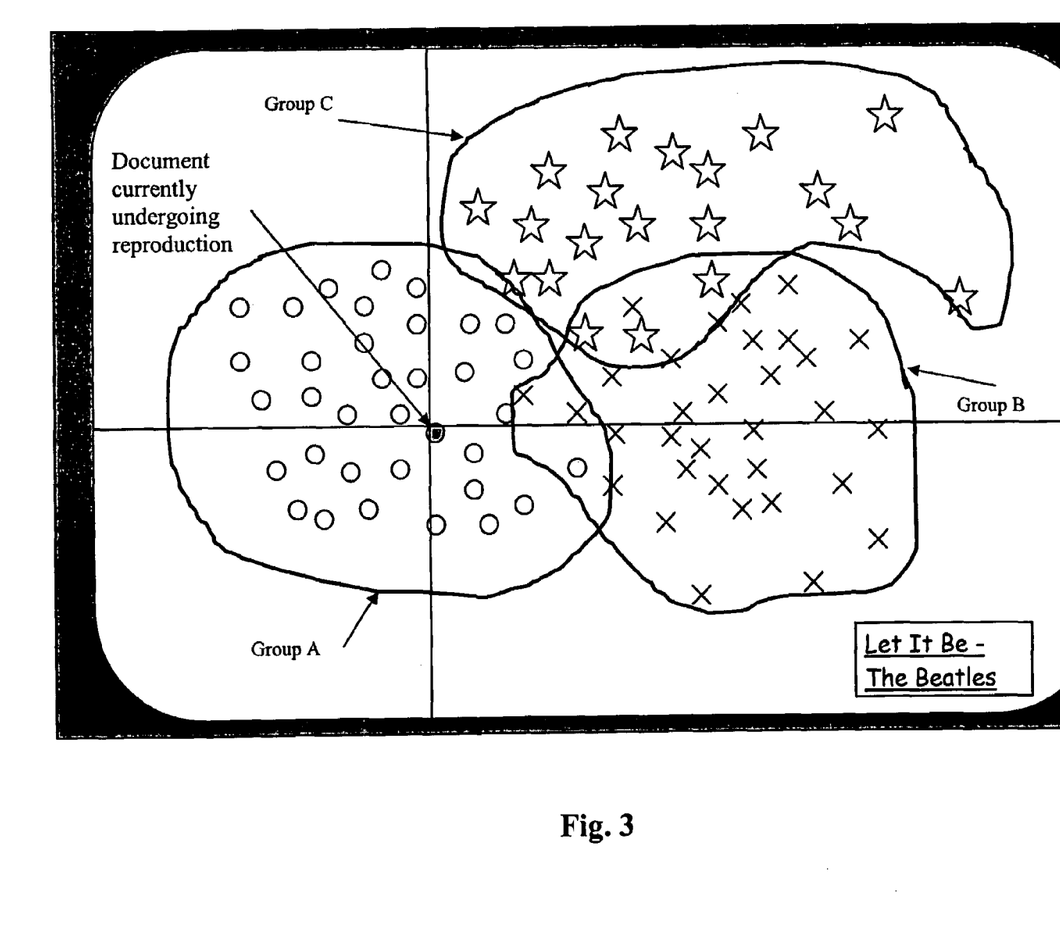

In a general manner, the coordinates $\{x_i, Y_2, \ldots zi\}$ of a graphics identifier in a multidimensional space allow the user to mentally picture the type of the associated sound document. Specifically, the positions of the graphics identifiers being calculated as a function of the values of low-level parameters, if two identifiers are graphically distant, the values of their low-level parameters are very different and hence, the type of the sound content is different. On the other hand, if two identifiers are close, the associated audio contents are likewise close in auditory fashion. Data analysis techniques exist which make it possible to discover the predominant dimensions (or dimension combinations) in a certain set of songs. This can be schematized by indicating that these are dimensions corresponding to the axes according to which the songs are most widely distributed. Advantageously, the navigator can analyse the sound documents and determine principal dimensions corresponding to types of audio contents, and it is then the navigator which chooses the number of dimension of the navigation space.

According to an improvement represented also in FIG. 3, the sound documents are grouped according to a "clustering" algorithm, for example the k-means algorithm. The graphics identifiers of the elements of one and the same group possess a common characteristic. According to a preferred embodiment, the colour of a graphics identifier depends on the group to which the document belongs (for example: blue, red and green). A variant described in FIG. 3 consists in giving the graphics identifier a particular shape: a circle, a cross or a star. An improvement represented in FIG. 3 consists in delimiting the groups with the aid of a contour consisting of a closed curved line. In the example illustrated by FIG. 3, the navigator has calculated three groups A, B and C, differentiated its members by three particular shapes, then has represented the contours of each group by a closed curve. The graphics identifiers associated with documents of a group appear clustered together on the screen. Specifically, the distribution of the identifiers on the screen is not very generally uniform, groupings of fairly close identifiers appear in the navigation space, these "nebulae" add visual benefit to navigation which chains together sound documents. Also found are isolated identifiers that a curious user may have an urge to listen to. By graphically distinguishing between groups representing different audio content types, the user "sees" his collection and can choose an audio content by selecting a graphics identifier from the appropriate group. The selection of an identifier is performed by moving a target consisting of two perpendicular straight lines, the intended object being at the intersection of the straight lines. The user moves the target with the aid of the direction keys of his remote control, or of a "joystick". A window at the bottom of the screen displays the title of the audio content undergoing reproduction, if this content suits the user, the latter presses "OK" and the content is reproduced. If the window contains no title, this signifies that the target is not aimed at any audio content.

In the above paragraph, the selection and the reproduction of a single sound document contained in the collection stored in memory 9 is described. We shall now describe automatic navigation over several audio contents.

To instigate the automatic chaining of several audio contents, the user must previously establish a navigation strategy. The user possesses good knowledge of the content of his collection by virtue of the graphic, the latter being reminiscent in a certain manner of nebulae positioned in space, the idea is to establish a path traversing these groups of elements. The representation of the groups of documents of the same type is not a necessity for navigation, nevertheless it affords an aid to the user who can better image how his audio collection is distributed.

Figure 4:
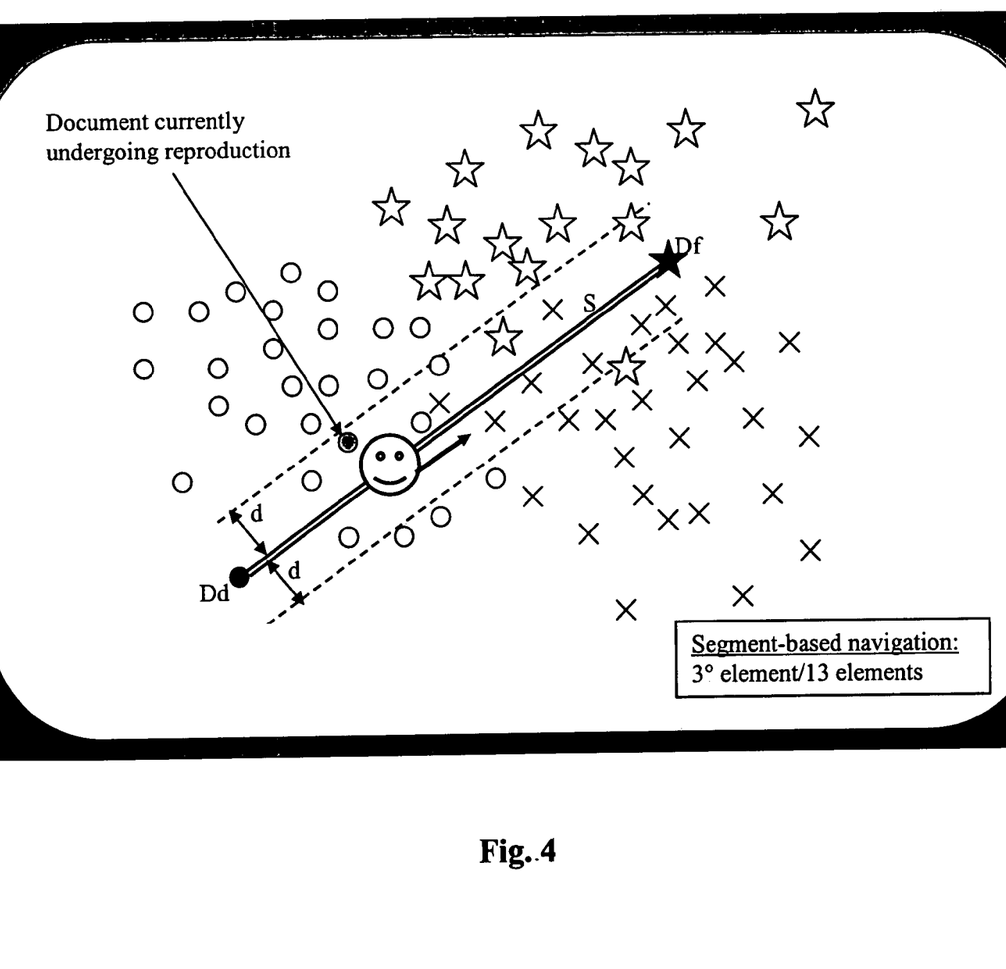

We shall now explain several strategies of automatic navigation that the user can select. The objective is to use the graphics representation as a means of definition for the selection of a strategy and for determining the automatic chaining of the documents. The first strategy is that of the straight line segment. This navigation strategy is shown by the drawing of FIG. 4. The user selects a starting document Dd (and hence a starting point) and a finishing document Df (respectively a finishing point), and instigates the navigation. The navigator then displays a segment S between these two graphics identifiers and calculates the distances of each identifier of the collection with the segment. Then, the navigator reproduces the sound document associated with the starting document, then reproduces one after the other the documents situated at a maximum distance from the segment. An improvement consists in displaying a mark (the smiling head of FIGS. 4 and 5 for example) moving over the segment from the starting point to the finishing point, and in calculating the distances with the graphics identifiers on the basis of this mark. Through the position of the mark on the segment, the user follows the evolution of the navigation and can determine the time remaining before reaching the finishing point.

According to this navigation strategy, the user introduces three parameters: the coordinates of a starting point (denoted Dd in FIG. 4), the coordinates of a finishing point (denoted Df in FIG. 4) and the maximum distance (denoted d in FIG. 4) between a graphics identifier selected by the navigator and the segment. One way of selecting the graphics identifiers consists in moving an index (a square containing the point to be selected) over the screen with the direction keys, the navigator automatically positions the square on a graphics identifier. As to the third parameter, the user keys in a value between 1 and 99.

As the distances of each graphics identifier of the collection with the segment are calculated before the first reproduction, the navigator knows the number of documents which will be reproduced successively and displays it in a graphics window in a corner of the screen. In the window is also displayed the serial number of the sound document undergoing reproduction.

This segment-based navigation strategy makes it possible to go from one type of sound document to another, the transition from one document to the other being made gently since the documents are graphically close.

Figure 5:
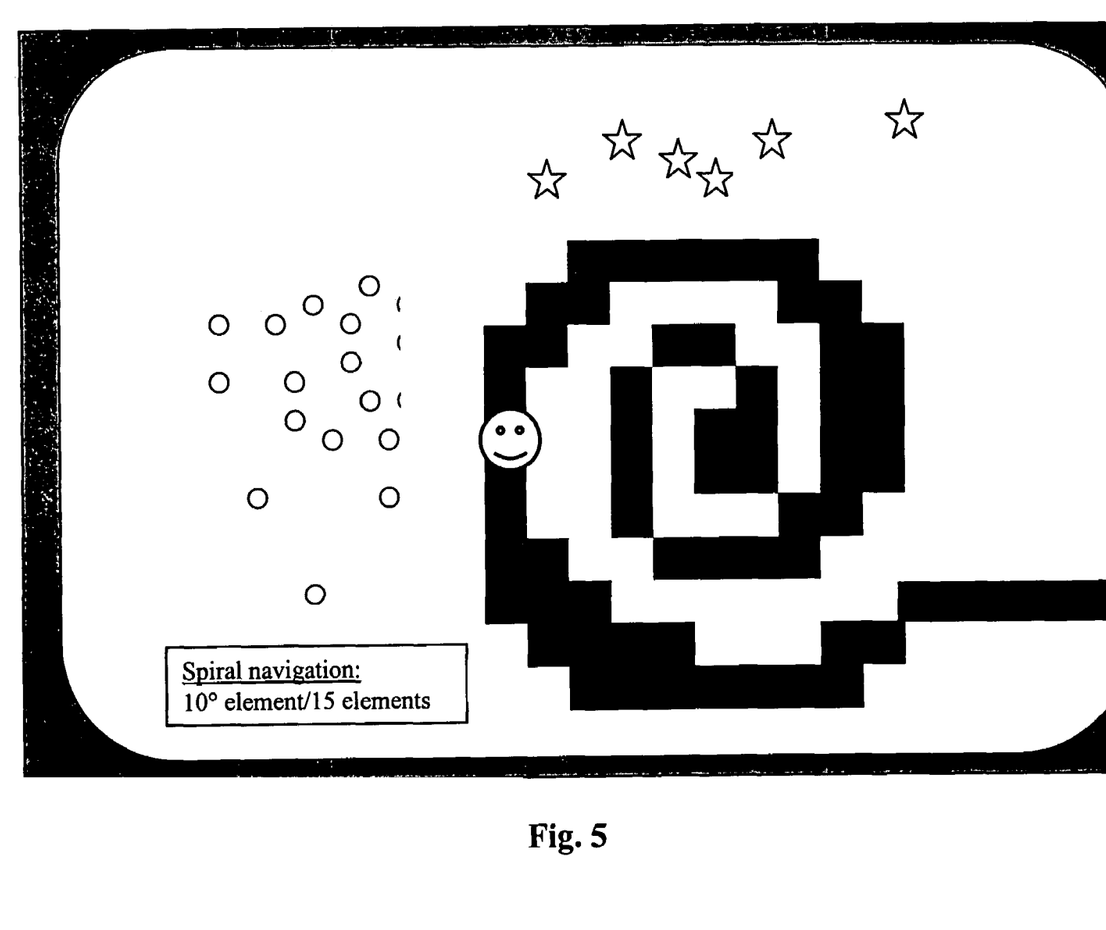

The spiral strategy is represented by FIG. 5, the user selects a starting document Dd (and hence a starting point), a radius of curvature R and instigates the navigation. The navigator then displays a spiral whose centre is the starting point and whose distance with respect to this identifier increases by the value R with each revolution. As previously, the navigator calculates the distances of each identifier displayed with the spiral. Then, the navigator reproduces the sound document associated with the starting document, then reproduces one after the other the documents situated at a maximum distance from the spiral. In the same way as previously, the navigator displays a mark which moves along the spiral in tandem with reproductions of documents, and, in a graphics window, the number of documents which will be successively reproduced and also the serial number of the sound document undergoing reproduction. The chaining of the reproductions stops when the navigator no longer finds any documents situated at the maximum distance, this generally corresponding to the fact that the index of the spiral has exited the screen.

If the user has placed the starting point bang in the middle of a group of sound documents, this strategy makes it possible to scan a large part of the group and hence to reproduce the same type of document for a long duration. On the other hand, if the user has placed the starting point at the boundary between two groups of sound documents, then with each revolution of the spiral, the navigator reproduces documents of one group then documents of the other group, thereby making it possible to vary the types of reproductions.

These two strategies make it possible to scan a part of the collection according to a chaining that is well determined and hence identically reproducible if the user introduces the same parameters. A third strategy involves a random aspect. The user selects a starting document Dd (and hence a starting point), and a circle radius, and instigates the navigation. The navigator then displays a circle whose centre is the starting point. Next, the navigator randomly selects the graphics identifiers inside the circumscribed zone and reproduces the associated documents. Navigation stops when all the documents have been reproduced. As previously, the navigator displays in a graphics window the number of documents which will be successively reproduced and also the serial number of the sound document undergoing reproduction. This third strategy has the same advantages as the second (according to the starting point) with additionally that of preventing the documents from being reproduced always with the same chaining.

When the number of documents accessible from the receiver is very large, it is no longer possible to display representations for each of them on the screen. According to an improvement; the graphics page displays a selection of the representations, the user then introduces a criterion for example the genre of the document such as it is defined in the attributes thereof, or else the date of creation of the document or the date of recording, or else if they are songs the name of the singer.

Although the present invention has been described with reference to the particular embodiments illustrated, it is in no way limited by these embodiments, but merely by the appended claims. It will be noted that changes or modifications may be made by the person skilled in the art.

The invention claimed is:

1. A method of selecting and reproducing of a sound document within a collection of sound documents stored in a reproduction apparatus furnished with a display device, comprising:
    storing each sound document of the collection,
    analyzing the documents stored to determine audio parameters specific to each document,
    positioning graphics identifiers corresponding to part of the sound documents on a graphics page of the display device, a position of each graphics identifier being dependent on the parameters calculated previously for a given document,
    automatically selecting and reproducing successively the sound documents according to a strategy taking into account the position of the graphics identifiers of the documents in the graphics page and a geometric characteristic specific to the reproduction apparatus, a total duration of the reproductions being equal to a sum of the durations of the selected sound documents, wherein the selection comprises automatically selecting and reproducing the documents whose graphics identifiers are situated in proximity to a graphics symbol based on a mathematical formula having a starting point and a finishing point, a first document selected being situated on the starting point or being closest to the starting point.

2. A method of selecting and reproducing of a sound document according to claim 1 further comprising:
    determining groups of documents possessing close parameter values, the graphics identifiers associated with the documents of a group having a similitude.

3. The method of selecting and reproducing of a sound document according to claim 2 further comprising:
    receiving a command for instigating navigation by specifying a navigation strategy used by the reproduction apparatus for automatically chaining a reproduction of the documents.

4. The method of selecting and reproducing of a sound document according to claim 2 further comprising:
    determining, by the reproduction apparatus a navigation strategy for automatically chaining a reproduction of the documents.

5. The method of selecting and reproducing of a sound document according to claim 1 wherein the graphics symbol is a straight line segment between the starting point and the finishing point.

6. The method of selecting and reproducing a sound document according to claim 1 wherein selection the graphics symbol is a geometric shape consisting of a line commencing from the staffing point and ending at an edge of the screen.

7. The method of selecting and reproducing of a sound document according to claim 1 further comprising:
    determining a subset of graphics identifiers, the feature of automatically selecting consisting of selecting randomly and successively each documents associated with the graphics identifiers of the subset of graphics identifiers.

8. The method of selecting and reproducing of a sound document according to claim 1 further comprising:

displaying a number of documents reproduced according to a determined strategy.

9. The method of selecting and reproducing of a sound document according to claim 1 further comprising:
displaying a serial number of the a document undergoing reproduction.

10. A reproduction apparatus comprising a central unit, a means for receiving sound documents, a means for storing the documents received, a means for introducing a user command, a means for analyzing the documents stored to determine audio parameters specific to each document, wherein the means for analyzing the documents stored comprises: a means for displaying a graphics page of graphics identifiers corresponding to part of the sound documents stored, a position of the graphics identifiers of each document being dependent on the previously calculated audio parameters, and a means for selecting sound documents for an automatic chaining of a reproduction of the selected sound documents according to a determined strategy taking into account a position of the graphics identifiers of the documents within the graphics page and a geometric characteristic specific to the reproduction apparatus, a reproduction means for chaining a reproduction of the selected documents during a total duration of the reproduction means being equal to a sum of the durations of the selected sound documents, wherein the means for selecting sound documents selects and reproduces documents whose graphics identifiers are situated in proximity to a graphics symbol based on a mathematical formula having a starting point and a finishing point, a first document selected being situated on the starting point or being closest to the starting point.

11. The reproduction apparatus according to claim 10 further comprising:
a means for determining groups of documents possessing close parameter values, the graphics identifiers associated with the documents of a group having a similitude.

12. The reproduction apparatus according to claim 10 further comprising:
a means for receiving a command for instigating navigation by specifying a navigation strategy used by the reproduction apparatus for automatically chaining the reproduction of the documents.

13. The reproduction apparatus according to claim 10 further comprising:
a means for determining by the reproduction apparatus, navigation strategy for automatically chaining the reproduction of the documents.

14. The reproduction apparatus according to claim 10 wherein the graphics symbol is a straight line segment between the starting point and the finishing point.

15. The reproduction apparatus according to claim 10 wherein the graphics symbol is a geometric shape consisting of a line commencing from the staffing point and ending at an edge of a screen.

16. The reproduction apparatus according to claim 10 further comprising:
a means for determining a subset of graphics identifiers, the means for selecting sound documents further comprising selecting randomly and successively each of the documents associated with the graphics identifiers of the said subset of graphic identifiers.

17. The reproduction apparatus according to claim 10 further comprising:
a means for displaying documents reproduced according to a strategy determined by the means for selecting sound documents.

18. The reproduction apparatus according to claim 10 further comprising:
a means for displaying a serial number of a document undergoing reproduction.

* * * * *

UNITED STATES PATENT AND TRADEMARK OFFICE
CERTIFICATE OF CORRECTION

PATENT NO. : 7,590,938 B2 Page 1 of 1
APPLICATION NO. : 10/562779
DATED : September 15, 2009
INVENTOR(S) : Chevallier et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 798 days.

Signed and Sealed this

Twenty-first Day of September, 2010

David J. Kappos
*Director of the United States Patent and Trademark Office*